US011661892B2

(12) United States Patent
Uhkötter et al.

(10) Patent No.: US 11,661,892 B2
(45) Date of Patent: May 30, 2023

(54) PLAIN BEARING FOR A PLANETARY GEAR BOX, PLANETARY GEAR BOX FOR A GAS TURBINE ENGINE, AND A GAS TURBINE ENGINE

(71) Applicants: Rolls-Royce Deutschland Ltd & Co KG, Blankenfelde-Mahlow (DE); Rolls-Royce plc, London (GB)

(72) Inventors: Stephan Uhkötter, Berlin (DE); Rens Douma, Berlin (DE); Uwe Kracht, Berlin (DE); Mark Binnington, Bristol (GB)

(73) Assignees: ROLLS-ROYCE DEUTSCHLAND LTD & CO KG, Blankenfelde-Mahlow (DE); ROLLS-ROYCE PLC, London (GB)

( * ) Notice: Subject to any disclaimer, the term of this patent is extended or adjusted under 35 U.S.C. 154(b) by 0 days.

(21) Appl. No.: 17/412,638

(22) Filed: Aug. 26, 2021

(65) Prior Publication Data

US 2022/0065173 A1 Mar. 3, 2022

(30) Foreign Application Priority Data

Aug. 28, 2020 (DE) .......................... 102020122584.9

(51) Int. Cl.
*F16H 57/04* (2010.01)
*F02C 7/36* (2006.01)
(Continued)

(52) U.S. Cl.
CPC .................. *F02C 7/36* (2013.01); *F02C 7/06* (2013.01); *F02K 3/06* (2013.01); *F16H 57/043* (2013.01);
(Continued)

(58) Field of Classification Search
CPC ...... F02C 7/36; F02C 7/06; F02K 3/06; F16H 57/043; F16H 57/0479; F05D 2220/323;
(Continued)

(56) References Cited

U.S. PATENT DOCUMENTS

| 8,790,213 B1 | 7/2014 | Isayama et al. |
| 2008/0096714 A1 | 4/2008 | McCune |

(Continued)

FOREIGN PATENT DOCUMENTS

| DE | 2702321 A1 | 7/1978 |
| DE | 102018219011 B3 * | 2/2020 |

(Continued)

OTHER PUBLICATIONS

German Search Report dated Apr. 27, 2021 from counterpart German Patent Application No. 10 2020 122 584.9.

*Primary Examiner* — Justin Holmes
(74) *Attorney, Agent, or Firm* — Shuttleworth & Ingersoll, PLC; Timothy J. Klima

(57) ABSTRACT

A planetary gear box for a gas turbine engine, has a planet carrier with a carrier element and a planet gear. The planet gear is mounted rotatably via a plain bearing on the carrier element. An oil feed pocket is provided in the region of an outer side of the carrier element, via which feed pocket oil can be passed into a bearing gap between the outer side of the carrier element and an inner side of the planet gear. In the circumferential region of a main load direction of the plain bearing, the carrier element is formed with at least one channel carrying transmission oil. The channel extends in the carrier element radially inside the outer side of the carrier element, extending in the axial direction of the carrier element, and includes a cross section closed with respect to the bearing gap.

23 Claims, 10 Drawing Sheets

(51) Int. Cl.
  *F02K 3/06*          (2006.01)
  *F02C 7/06*          (2006.01)
(52) U.S. Cl.
  CPC ... *F16H 57/0479* (2013.01); *F05D 2220/323* (2013.01); *F05D 2220/36* (2013.01); *F05D 2240/54* (2013.01); *F05D 2260/40311* (2013.01); *F05D 2260/98* (2013.01)
(58) Field of Classification Search
  CPC ............ F05D 2220/36; F05D 2240/54; F05D 2260/40311; F05D 2260/98; Y02T 50/60
  See application file for complete search history.

(56) References Cited

U.S. PATENT DOCUMENTS

| | | |
|---|---|---|
| 2015/0192199 A1 | 7/2015 | Feraud et al. |
| 2017/0328404 A1 | 11/2017 | Morreale et al. |
| 2018/0313404 A1 | 11/2018 | Hoelzl et al. |

FOREIGN PATENT DOCUMENTS

| | | | | |
|---|---|---|---|---|
| DE | 102018218932 A1 | | 5/2020 | |
| DE | 102019008948 A1 | * | 6/2021 | |
| WO | WO-2021063437 A1 | * | 4/2021 | ............. F03D 15/00 |

* cited by examiner

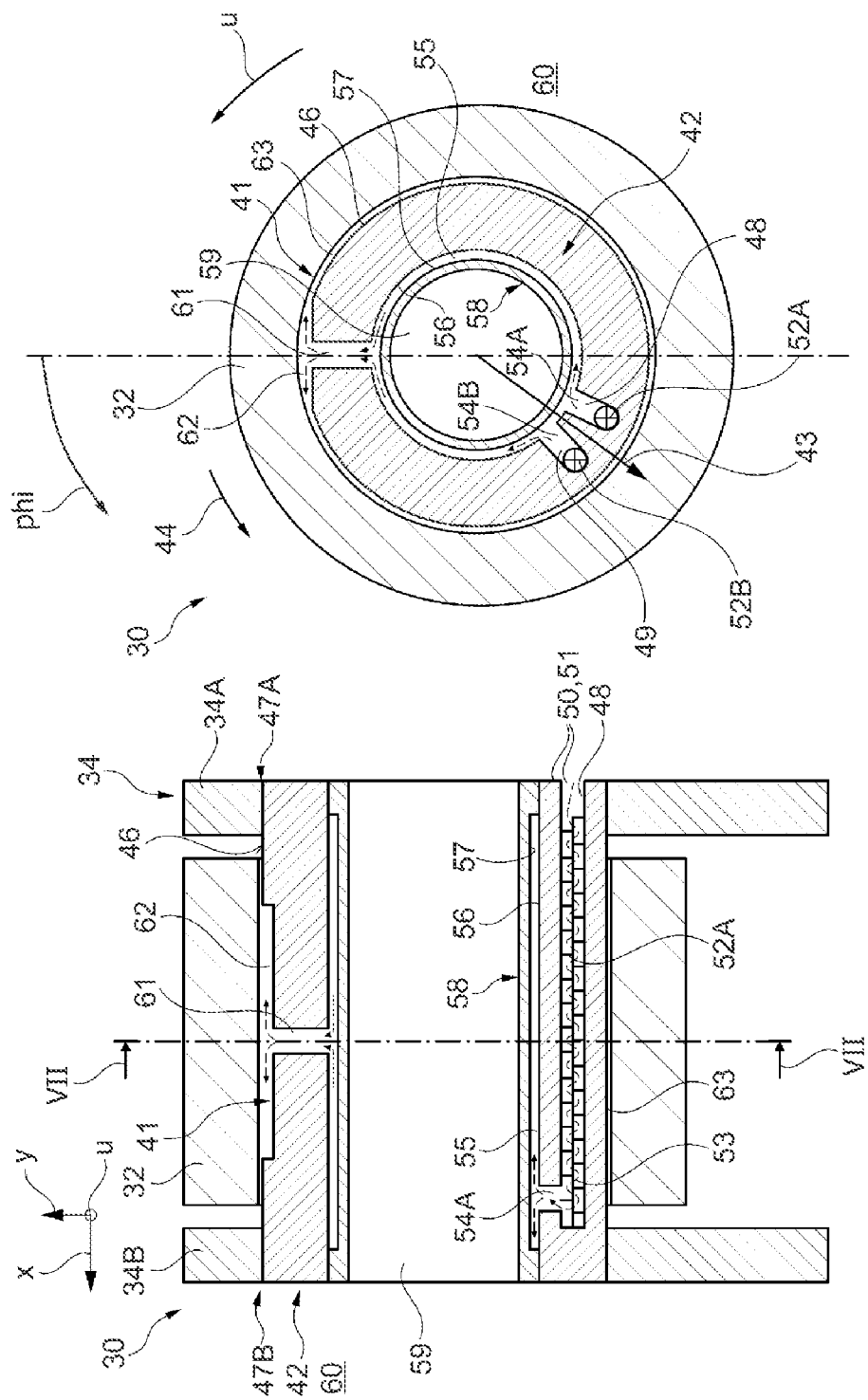

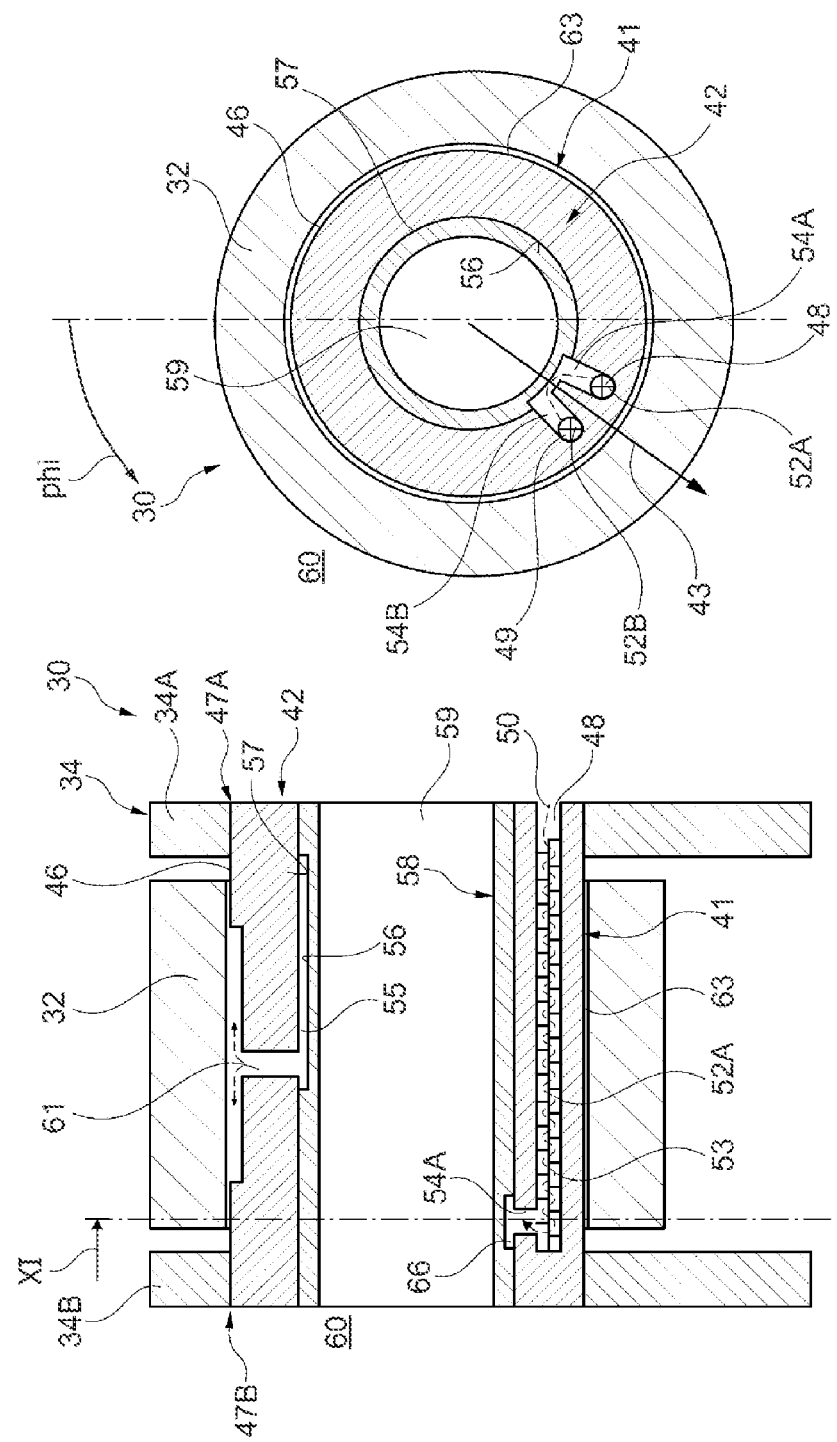

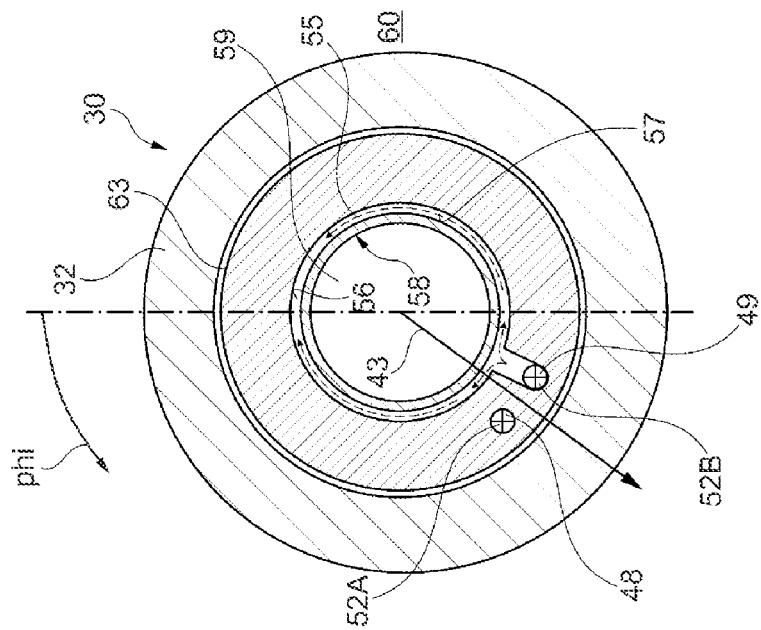
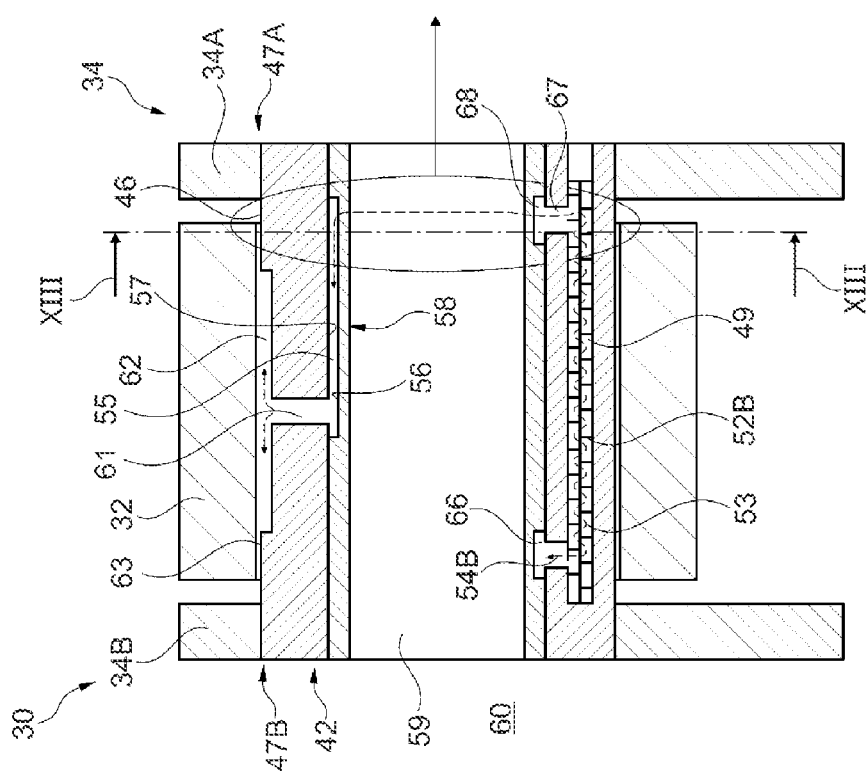
Fig. 12
Fig. 13

PLAIN BEARING FOR A PLANETARY GEAR BOX, PLANETARY GEAR BOX FOR A GAS TURBINE ENGINE, AND A GAS TURBINE ENGINE

CROSS-REFERENCE TO A RELATED APPLICATION

This application claims priority to German Patent Application DE102020122584.9 filed Aug. 28, 2020, the entirety of which is incorporated by reference herein.

The present disclosure relates to a plain bearing for a planetary gear box, in particular for a planetary gear box of a gas turbine engine. Furthermore, the disclosure relates to a planetary gear box for a gas turbine engine, having a planet carrier and having at least one planet gear, which is mounted rotatably on a carrier elements by means of a plain bearing. In addition, the disclosure relates to a gas turbine engine having a planetary gear box of this kind.

Apart from rolling bearings, plain bearings are the most frequently used type of bearing in the construction of machinery and equipment. Here, the two parts that move relative to one another in the plain bearing are in direct contact. They slide on one another against the resistance caused by sliding friction. This can be kept low by selecting a low-friction pair of materials, by lubrication or by the production of a lubricating film which separates the two contact surfaces. If the two parts come into contact, which is the case with most plain bearings that are used, wear occurs on the contact surfaces, limiting the service life of a plain bearing. In the case of fluid lubrication, the production of the separating lubricating film requires additional expenditure. The sliding resistance has the effect that some of the kinetic energy is converted into heat energy, which flows into the two bearing parts and may have to be dissipated.

Plain bearings are differentiated inter alia according to sliding resistance. In this context, a distinction is drawn between simple plain bearings, hydrodynamic plain bearings and hydrostatic plain bearings. Simple plain bearings are either unlubricated or lubricated by means of a lubricant, such as grease. Depending on the design of a plain bearing, the sliding resistance results from what is known as solid body friction, mixed friction or viscous friction.

In the case of plain bearings with solid body friction, which is often also referred to as dry friction, low-friction pairs of materials are used. Sometimes, one of the two partners has what is known as a self-lubricating property. The second partner is generally produced from steel.

In turbines and generators, use is often made of plain bearings between whose partners the sliding resistance results from viscous friction. The desired lubricating film in the bearing gap must be put under pressure to ensure that the contact surfaces can be separated from one another counter to the bearing force. In the case of hydrostatic plain bearings, an oil pump is used for this purpose. In contrast, the oil pressure in the lubricating film in the case of "hydrodynamic" plain bearings is produced by the contact surfaces themselves as they move relative to one another.

In the case of gear boxes which are used in gas turbine engines of aircraft, there are special requirements on plain bearings owing to the limited amount of oil available and the, in some cases, high operating temperatures. In addition, a total weight of a gas turbine engine should be as low as possible. However, this requirement demands that a rigidity of the design is characterized by a lower rigidity in comparison with conventional applications, such as stationary industrial applications.

Owing to the high loads in the region of plain bearings of gear boxes of gas turbine engines, unwanted thermal deformations can occur in the region of a plain bearing, and these have a negative effect on functionality and operating safety. Moreover, only a small part of the oil flow supplied reaches the highly loaded region of a plain bearing, where the highest temperatures occur. The effect is that, in the more highly loaded regions of such plain bearings, high local temperatures occur, and these may also be critical for the coating in the region of the bearing surfaces.

It is the underlying object of the present disclosure to make available a plain bearing for a planetary gear box, in particular for a planetary gear box of a gas turbine engine, a planetary gear box for a gas turbine engine, as well as a gas turbine engine which has a planetary gear box of this kind, which are each distinguished by a long service life.

This object is achieved by a planetary gear box, by a gas turbine engine and by a plain bearing having features as disclosed herein. Advantageous developments form the subject matter of the dependent claims and of the following description.

A planetary gear box for a gas turbine engine, having a planet carrier and at least one planet gear, is proposed. The planet gear is mounted rotatably by means of a plain bearing on a carrier element, which is connected to the planet carrier in a manner precluding relative rotation. At least one oil feed pocket is provided in the region of an outer side of the carrier element, via which feed pocket oil can be passed into a bearing gap between the outer side of the carrier element and an inner side of the planet gear. In the circumferential region of a main load direction of the plain bearing, the carrier element, which may be what is known as a planet pin, is formed with at least one channel carrying transmission oil. The channel is provided in the carrier element in such a way as to extend radially inside the outer side of the carrier element, extending in the axial direction of the carrier element at least in some region or regions. Furthermore, the channel is embodied with a cross section that is closed with respect to the bearing gap.

In the present case, the term "channel" is understood to be a line or a closed channel through which oil can be passed and which has a closed cross section which is round, elliptical or rectangular or embodied in some other suitable way.

The closed cross section of the channel prevents oil from escaping directly from the channel and via the outer side of the carrier element into the bearing gap. Thus, the entire oil volume flow that is introduced into the channel flows through the channel and removes heat energy from the carrier element, especially in the highly stressed region of the plain bearing. Both a load bearing capacity of the plain bearing and a service life of the plain bearing are thereby increased.

In other words, the planetary gear box according to the present disclosure comprises at least one channel or cooling channel integrated into the plain bearing. The channel is arranged in the plain bearing in such a way that the transmission oil which is guided through the channel counteracts the unwanted thermal deformations of the plain bearing, particularly in the region of the highly loaded zone of the plain bearing.

The reduced thermal deformations in the region of the carrier element or planet pin counteract an unwanted reduction in the height of the bearing gap close to the main load zone. This is a simple way of improving the service life in comparison with known plain bearing designs.

The at least one channel offers the possibility of reducing a maximum operating temperature in the region of the carrier element in comparison with known solutions, and this has a positive effect on the thermal stability of the coating in the region of the outer side of the carrier element and in the region of the inner side of the planet gear.

The at least one channel can be of open design in the axial direction of the carrier element, at least in the region of one end of the carrier element, and can be connected to a discharge device. Via the discharge device, the oil can be guided out of the channel in the direction of a tooth profile of the planet gear in order to be able to cool and lubricate a tooth engagement location of the planet gear with a further gearwheel, such as a sun gear, a ring gear and/or a further planet gear.

In this case, the discharge device can be embodied, for example, as a nozzle or the like, by means of which the oil is sprayed as an oil jet onto the toothing.

In an advantageous embodiment of the planetary gear box according to the present disclosure, the planet carrier is of non-rotatable design. With such a design, a main load direction of the plain bearing can enclose an angle of about 90° with a radial direction of the planet carrier in the direction of rotation of the planet gear. The at least one channel can then be arranged in a circumferential region of the plain bearing which encloses angular values in a range of from 60° to 150°, preferably of from 90° to 135°, with the radial direction of the planet carrier in the direction of rotation of the planet gear. In addition, there is the possibility that the oil feed pocket is arranged outside a circumferential region of the plain bearing which encloses angular values in a range of from 10° to 120°, preferably of from 10° to 100°, with the radial direction of the planet carrier in the direction of rotation of the planet gear.

This embodiment of the planetary gear box ensures that the channel is arranged in the region of the main load zone of the plain bearing, in which the heat input into the carrier element is highest. It is then possible by means of the transmission oil that is passed through the channel to selectively dissipate heat energy in the region of the main load zone of the plain bearing and to limit thermal deformations resulting from the heat input.

In this embodiment of the planetary gear box according to the present disclosure, it is additionally ensured that the oil feed pocket is arranged outside the highly loaded zone of the plain bearing in the circumferential direction of the plain bearing. The oil can thus be introduced to the desired extent from the oil feed pocket into the bearing gap of the plain bearing.

Moreover, there is also the possibility of making the planet carrier of the planetary gear box according to the present disclosure rotatable. A main load direction of the plain bearing can then enclose, depending on the operating point, angular values of from 110° to 180° with a radial direction of the planet carrier in the direction of rotation of the planet gear with respect to the carrier element. The at least one channel can be arranged in a circumferential region of the plain bearing which encloses angular values in a range of from 120° to 225°, preferably of from 120° to 200°, with the radial direction of the planet carrier in the direction of rotation of the planet gear. In addition, there is the possibility that the oil feed pocket is arranged outside a circumferential region of the plain bearing which encloses angular values in a range of from 90° to 190°, preferably of from 30° to 210°, with the radial direction of the planet carrier in the direction of rotation of the planet gear. This ensures that the oil feed pocket is arranged outside a highly loaded region of the plain bearing and that oil can be introduced into the bearing gap between the planet gear and the carrier element with little effort.

In other embodiments of the planetary gear box according to the present disclosure, the channel can extend in the carrier element radially inside the outer side of the carrier element in the axial direction and/or in the circumferential direction of the carrier element. Heat energy can then be removed from the highly loaded region of the plain bearing in a manner which is simple in terms of design, and thermal deformations of the plain bearing can be limited to the desired extent.

In addition, there is the possibility that the planetary gear box according to the present disclosure has a plurality of channels, which is provided in such a way as to extend in the axial direction and/or in the circumferential direction of the carrier element. It is thereby possible, in the region of the carrier element, to remove heat energy to the desired extent from the highly loaded region over a larger region in the circumferential direction, and to limit thermal deformations of the plain bearing to the required extent.

If the channels are connected fluidically to one another, a design effort for the introduction of transmission oil into the channels is limited in a simple manner. This is the case when the transmission oil is introduced into one of the channels and then passed on from said channel into a further channel or into further channels.

The channel or channels can be connected fluidically to the at least one oil feed pocket downstream of a feed region of the transmission oil into the channel or channels. It is then necessary to provide just one feed for the oil which is to be passed through the channel or channels and additionally for the transmission oil which is to be introduced into the bearing gap of the plain bearing. This is a simple way of limiting the design effort.

In addition, power losses are also reduced thereby. This results from the fact that the transmission oil which is introduced into the channel or channels is carried directly from the channel or channels to the oil feed pocket. The circuitous route for the oil, starting from the channel or channels, via a gear box return into an oil circuit and only then to the oil feed pocket gives rise to losses which do not occur when the oil feed pocket is supplied directly from the channel or channels.

In another embodiment of the planetary gear box according to the present disclosure, a feed region is provided, via which oil can be introduced into the carrier element. The feed region can be connected to the channel or to the channels and to the at least one oil feed pocket via lines in the carrier element. The oil which is introduced into the carrier element via the feed region can be guided via the lines partially into the channel or channels and partially into the oil feed pocket.

Depending on the respective application, the channel or channels can each have diameters of between 5 mm and 15 mm.

The channels can be operatively connected to the feed regions in such a way that transmission oil is guided in co-current or countercurrent flow at least in two channels extending adjacent to one another in the carrier element. Particularly in the case of guidance of the transmission oil or of the transmission oil in countercurrent flow, a temperature profile which is as uniform as possible can be achieved in the circumferential direction and/or in the axial direction of the carrier element, said temperature profile having a positive effect on the service life of the plain bearing and thus of the planetary gear box.

In another planetary gear box embodiment of simple design in accordance with the present disclosure, at least the two adjacent channels through which the transmission oil is guided in co-current flow are each operatively connected on the inlet side to the feed region for the transmission oil.

Furthermore, provision can be made for at least one of the two channels through which the transmission oil is guided in countercurrent flow to be operatively connected on the inlet side to the feed region and connected on the outlet side to the inlet side of the adjacent channel.

The carrier element can be embodied, at least in some region or regions, with an aperture provided radially inside the outer side. In this case, there is the possibility that at least one region of the channel or at least one of the channels is embodied in the region of the inner aperture as a groove which extends in the radial direction and/or in the circumferential direction of the carrier element. The groove can be sealed off from an environment of the carrier element by a further component part, thereby avoiding leaks and associated power losses as well as a reduction in the cooling capacity in a simple manner.

The further component part and the carrier element can delimit a region which carries transmission oil and which establishes a connection between the outlet of the channel or between at least one outlet of one of the channels and the oil feed pocket. This makes it possible once again to establish the connection between the channel or channels and the oil feed pocket in a manner which is simple in terms of design.

The region carrying transmission oil can be connected to the oil feed pocket in a manner which is simple in terms of design by a hole which extends radially in the carrier element.

To increase the temperature control performance, provision can be made to provide respective flow-guiding units in the channel or in the channels for the transmission oil. By means of the flow-guiding units or turbulators, the flow of the transmission oil in the channel or in the channels can in each case be deflected. In this case, the flow can be deflected in such a way that mixing of the transmission oil or the transmission oil which is passed through the channel or through the channels takes place in the channel or channels and hence the transmission oil is guided with a low temperature gradient across the flow cross section of the channel or across the flow cross sections of the channels.

In the case of a gas turbine engine which is described and claimed herein, a combustion chamber may be provided so as to be axially downstream of the fan and the compressor(s). For example, the combustion chamber can lie directly downstream of the second compressor (for example at the exit of the latter), if a second compressor is provided. By way of further example, the flow at the exit of the compressor may be supplied to the inlet of the second turbine, if a second turbine is provided. The combustion chamber may be provided upstream of the turbine(s).

The or each compressor (for example the first compressor and the second compressor as described above) may comprise any number of stages, for example multiple stages. Each stage may comprise a row of rotor blades and a row of stator vanes, the latter potentially being variable stator vanes (in that the angle of incidence of said stator vanes can be variable). The row of rotor blades and the row of stator vanes may be axially offset from one another.

The or each turbine (for example the first turbine and the second turbine as described above) may comprise any number of stages, for example multiple stages. Each stage may comprise a row of rotor blades and a row of stator vanes. The row of rotor blades and the row of stator vanes may be axially offset from one another.

Each fan blade may be defined as having a radial span width extending from a root (or a hub) at a radially inner location flowed over by gas, or at a 0% span width position, to a tip at a 100% span width position. The ratio of the radius of the fan blade at the hub to the radius of the fan blade at the tip may be less than (or of the order of): 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range delimited by two of the values in the previous sentence (that is to say that the values may form upper or lower limits). These ratios may be referred to in general as the hub-to-tip ratio. The radius at the hub and the radius at the tip can both be measured at the leading periphery part (or the axially frontmost periphery) of the blade. The hub-to-tip ratio refers, of course, to that portion of the fan blade which is flowed over by gas, that is to say the portion that is situated radially outside any platform.

The radius of the fan can be measured between the engine centerline and the tip of the fan blade at the leading periphery of the latter. The diameter of the fan (which can simply be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range delimited by two of the values in the previous sentence (that is to say that the values may form upper or lower limits).

The rotational speed of the fan may vary during use. Generally, the rotational speed is lower for fans with a comparatively large diameter. Purely by way of non-limiting example, the rotational speed of the fan under cruise conditions may be less than 2500 rpm, for example less than 2300 rpm. Purely by way of a further non-limiting example, the rotational speed of the fan under cruise conditions for an engine having a fan diameter in the range from 250 cm to 300 cm (for example 250 cm to 280 cm) may also be in the range from 1700 rpm to 2500 rpm, for example in the range from 1800 rpm to 2300 rpm, for example in the range from 1900 rpm to 2100 rpm. Purely by way of a further non-limiting example, the rotational speed of the fan under cruise conditions for an engine having a fan diameter in the range from 320 cm to 380 cm may be in the range from 1200 rpm to 2000 rpm, for example in the range from 1300 rpm to 1800 rpm, for example in the range from 1400 rpm to 1600 rpm.

During use of the gas turbine engine, the fan (with associated fan blades) rotates about an axis of rotation. This rotation results in the tip of the fan blade moving with a velocity $U_{tip}$. The work done by the fan blades on the flow results in an enthalpy rise dH in the flow. A fan tip loading can be defined as $dH/U_{tip}^2$, where dH is the enthalpy rise (for example the 1-D average enthalpy rise) across the fan and $U_{tip}$ is the (translational) velocity of the fan tip, for example at the leading periphery of the tip (which can be defined as the fan tip radius at the leading periphery multiplied by the angular velocity). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range delimited by two of the values in the previous sentence (that is to say that the values may form upper or lower limits).

Gas turbine engines in accordance with the present disclosure can have any desired bypass ratio, where the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range delimited by two of the values in the previous sentence (that is to say that the values may form upper or lower limits). The bypass duct may be substantially annular. The bypass duct may be situated radially outside the engine core. The radially outer surface of the bypass duct may be defined by an engine nacelle and/or a fan casing.

The overall pressure ratio of a gas turbine engine as described and claimed herein may be defined as the ratio of the stagnation pressure upstream of the fan to the stagnation pressure at the exit of the highest pressure compressor (before the entry to the combustion chamber). By way of non-limiting example, the overall pressure ratio of a gas turbine engine as described and claimed herein at cruising speed may be greater than (or of the order of): 35, 40, 45, 50, 55, 60, 65, 70, 75. The overall pressure ratio may be in an inclusive range delimited by two of the values in the previous sentence (that is to say that the values may form upper or lower limits).

The specific thrust of a gas turbine engine may be defined as the net thrust of the gas turbine engine divided by the total mass flow through the engine. The specific thrust of an engine as described and/or claimed herein at cruise conditions may be less than (or of the order of): 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range delimited by two of the values in the previous sentence (that is to say that the values may form upper or lower limits). Such gas turbine engines can be particularly efficient in comparison with conventional gas turbine engines.

A gas turbine engine as described and claimed herein may have any desired maximum thrust. Purely by way of a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN, or 550 kN. The maximum thrust may be in an inclusive range delimited by two of the values in the previous sentence (that is to say that the values may form upper or lower limits). The thrust referred to above may be the maximum net thrust at standard atmospheric conditions at sea level plus 15 degrees C. (ambient pressure 101.3 kPa, temperature 30 degrees C.) in the case of a static engine.

During use, the temperature of the flow at the entry to the high-pressure turbine can be particularly high. This temperature, which can be referred to as TET, may be measured at the exit to the combustion chamber, for example directly upstream of the first turbine blade, which in turn can be referred to as a nozzle guide blade. At cruising speed, the TET may be at least (or of the order of): 1400 K, 1450 K, 1500 K, 1550 K, 1600 K, or 1650 K. The TET at constant speed may be in an inclusive range delimited by two of the values in the previous sentence (that is to say that the values may form upper or lower limits). The maximum TET in the use of the engine may be at least (or of the order of), for example: 1700 K, 1750 K, 1800 K, 1850 K, 1900 K, 1950 K, or 2000 K. The maximum TET may be in an inclusive range delimited by two of the values in the previous sentence (that is to say that the values may form upper or lower limits). The maximum TET may occur, for example, under a high thrust condition, for example under a maximum take-off thrust (MTO) condition.

A fan blade and/or an airfoil portion of a fan blade as described herein can be manufactured from any suitable material or a combination of materials. For example, at least a part of the fan blade and/or of the airfoil can be manufactured at least in part from a composite, for example a metal matrix composite and/or an organic matrix composite, such as carbon fiber. By way of further example, at least a part of the fan blade and/or of the airfoil can be manufactured at least in part from a metal, such as a titanium-based metal or an aluminum-based material (such as an aluminum-lithium alloy) or a steel-based material. The fan blade may comprise at least two regions which are manufactured using different materials. For example, the fan blade may have a protective leading periphery, which is manufactured using a material that is better able to resist impact (for example of birds, ice, or other material) than the rest of the blade. Such a leading periphery may, for example, be manufactured using titanium or a titanium-based alloy. Thus, purely by way of example, the fan blade may have a carbon-fiber-based or aluminum-based body (such as an aluminum-lithium alloy) with a titanium leading periphery.

A fan as described herein may comprise a central portion from which the fan blades can extend, for example in a radial direction. The fan blades may be attached to the central portion in any desired manner. For example, each fan blade may comprise a fixing device which can engage with a corresponding slot in the hub (or disk). Purely by way of example, such a fixing device may be in the form of a dovetail that can be inserted into and/or engage with a corresponding slot in the hub/disk in order for the fan blade to be fixed to the hub/disk. By way of further example, the fan blades can be formed integrally with a central portion. Such an arrangement may be referred to as a blisk or a bling. Any suitable method may be used to manufacture such a blisk or such a bling. For example, at least a part of the fan blades can be machined from a block and/or at least a part of the fan blades can be attached to the hub/disk by welding, such as linear friction welding, for example.

The gas turbine engines as described and claimed herein may or may not be provided with a variable area nozzle (VAN). Such a variable area nozzle can allow the exit cross section of the bypass duct to be varied during use. The general principles of the present disclosure can apply to engines with or without a VAN.

The fan of a gas turbine engine as described and claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or the gas turbine engine at the midpoint (in terms of time and/or distance) between end of climb and start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any arbitrary speed within these ranges can be the constant cruise condition. In the case of some aircraft, the constant cruise conditions may be outside these ranges, for example below Mach 0.7 or above Mach 0.9.

Purely by way of example, the cruise conditions may correspond to standard atmospheric conditions at an altitude that is in the range from 10,000 m to 15,000 m, for example in the range from 10,000 m to 12,000 m, for example in the range from 10,400 m to 11,600 m (around 38,000 ft), for example in the range from 10,500 m to 11,500 m, for example in the range from 10,600 m to 11,400 m, for example in the range from 10,700 m (around 35,000 ft) to 11,300 m, for example in the range from 10,800 m to 11,200 m, for example in the range from 10,900 m to 11,100 m, for example of the order of 11,000 m. The cruise conditions may correspond to standard atmospheric conditions at any given altitude in these ranges.

Purely by way of example, the cruise conditions may correspond to the following: a forward Mach number of 0.8; a pressure of 23,000 Pa; and a temperature of −55 degrees C.

As used anywhere herein, "cruising speed" or "cruise conditions" may mean the aerodynamic design point. Such an aerodynamic design point (or ADP) may correspond to the conditions (including, for example, the Mach number, environmental conditions, and thrust requirement) for which the fan operation is designed. This may mean, for example, the conditions under which the fan (or the gas turbine engine) has the optimum efficiency in terms of construction.

During use, a gas turbine engine as described and claimed herein can operate at the cruise conditions defined elsewhere herein. Such cruise conditions can be determined by the cruise conditions (for example the mid-cruise conditions) of an aircraft to which at least one (for example 2 or 4) gas turbine engine can be fastened in order to provide the thrust force.

Moreover, a plain bearing for a planetary gear box, in particular for a planetary gear box of a gas turbine engine of an aircraft, is proposed. The plain bearing comprises a static axle and a component part mounted rotatably on the axle. At least one oil feed pocket is provided in the region of an outer side of the axle, via which feed pocket oil can be passed into a bearing gap between the outer side of the axle and an inner side of the rotatable component part. In the circumferential region of a main load direction of the plain bearing, the axle is formed with at least one channel carrying transmission oil. The channel is provided in such a way as to extend in the axle radially inside the outer side of the axle, extending in the axial direction of the axle at least in some region or regions, and is embodied with a cross section that is closed with respect to the bearing gap.

The closed cross section of the channel prevents oil from escaping from the channel directly into the bearing gap. Thus, the entire oil volume flow that is introduced into the channel flows through the channel and removes heat energy from the carrier element, especially in the highly stressed region of the plain bearing. Both a load bearing capacity of the plain bearing and a service life of the plain bearing are thereby increased.

The at least one channel of the plain bearing according to the present disclosure can be of open design in the axial direction of the static axle, at least in the region of one end of the axle, and can be connected to a discharge device. Via the discharge device, the oil can be guided out of the channel in the direction of a tooth profile of the rotatable component part, which can be designed as a gearwheel, in order to be able to cool and lubricate a tooth engagement location of the component part with a further gearwheel, such as a sun gear, a ring gear and/or a further planet gear.

In this case, the discharge device can be embodied as a nozzle or the like, by means of which the oil is sprayed as an oil jet onto the toothing.

In the case where the axle is connected to a non-rotatable component part in a manner precluding relative rotation, a main load direction of the plain bearing can enclose an angle of about 90° with a radial direction of the non-rotatable component part in the direction of rotation of the rotatable component part. In addition, there is the possibility that the at least one channel is arranged in a circumferential region of the axle which encloses angular values in a range of from 60° to 150°, preferably of from 90° to 135°, with the radial direction of the non-rotatable component part in the direction of rotation of the rotatable component part. Furthermore, in the circumferential direction, the oil feed pocket can be arranged outside a circumferential region of the axle which encloses angular values in a range of from 10° to 120°, preferably of from 10° to 100°, with the radial direction of the non-rotatable component part in the direction of rotation.

Moreover, the axle can be connected to a further non-rotatable component part in a manner precluding relative rotation. Depending on the operating point, a main load direction of the plain bearing then encloses angular values of from 110° to 180° with a radial direction of the further rotatable component part in the direction of rotation of the rotatable component part. The at least one channel can then be arranged in a circumferential region of the axle which encloses angular values in a range of from 120° to 225°, preferably of from 120° to 200°, with the radial direction of the further rotatable component part in the direction of rotation of the rotatable component part. In addition, there is the possibility that, in the circumferential direction, the oil feed pocket is arranged outside a circumferential region of the axle which encloses angular values in a range of from 90° to 190°, preferably of from 30° to 210°, with the radial direction of the further rotatable component part in the direction of rotation of the rotatable component part.

In other advantageous embodiments of the plain bearing according to the present disclosure, the channel can extend in the axle radially inside the outer side of the axle in the axial and/or in the circumferential direction of the axle.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

The present disclosure is not restricted to the indicated combination of features of the additional independent claims or claims dependent thereon. There are furthermore possibilities of combining individual features, including those which emerge from the claims, the following description of embodiments and directly from the drawing. Reference to the drawings by the claims through the use of reference signs is not intended to restrict the scope of protection of the claims.

Preferred developments will become apparent from the dependent claims and the following description. Exemplary embodiments of the subject matter according to the present invention are explained in greater detail with reference to the drawing, without being restricted thereto. In the figures:

FIG. 6 shows a sectional view of an embodiment of the planetary gear box along a section line VI-VI denoted more specifically in FIG. 3;

FIG. 7 shows a sectional view of the embodiment of the planetary gear box shown in FIG. 6 along a section line VII-VII denoted more specifically in FIG. 6;

FIG. 10 shows an illustration corresponding to that of FIG. 6 of a further exemplary embodiment of the planetary gear box according to FIG. 3;

FIG. 11 shows a sectional view of the embodiment of the planetary gear box according to FIG. 10 along a section line XI-XI denoted more specifically in FIG. 10;

FIG. 12 shows an illustration corresponding to that of FIG. 6 of a further embodiment of the planetary gear box according to FIG. 3;

FIG. 13 shows a sectional view of the embodiment of the planetary gear box according to FIG. 12 along a section line XIII-XIII denoted more specifically in FIG. 12;

Figure 3:
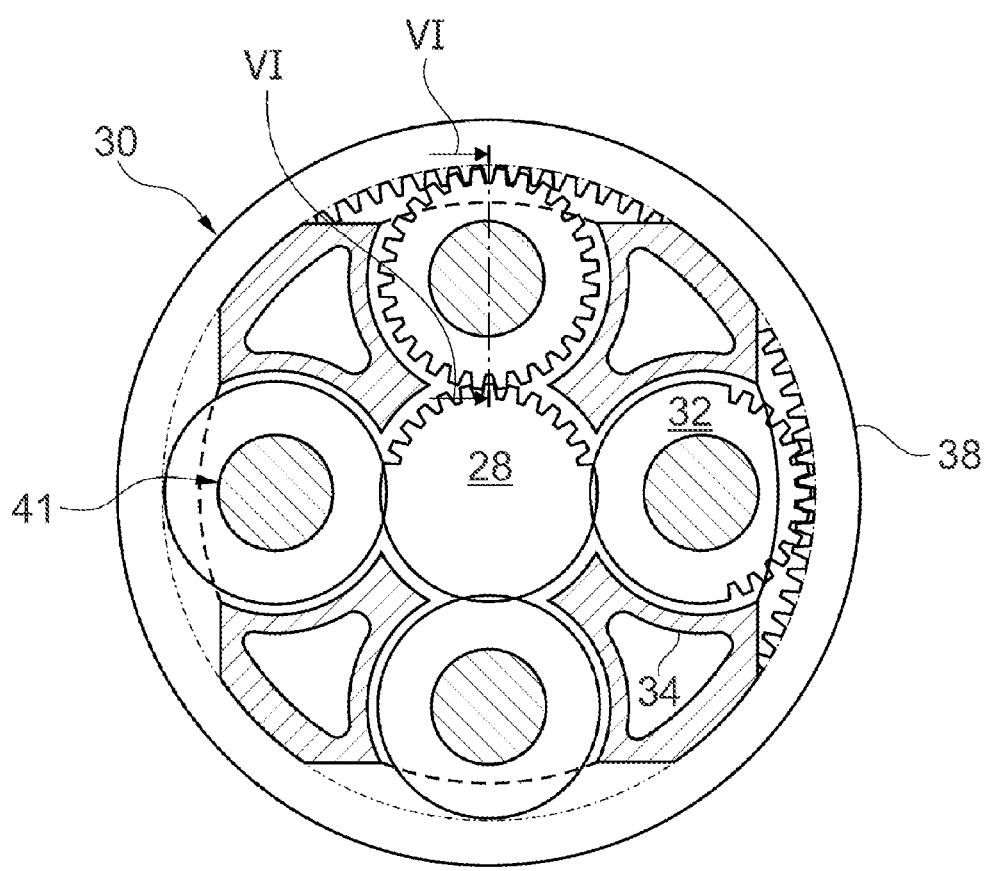
FIG. 3 shows an isolated illustration of a gear box for a gas turbine engine.
Figure 15:
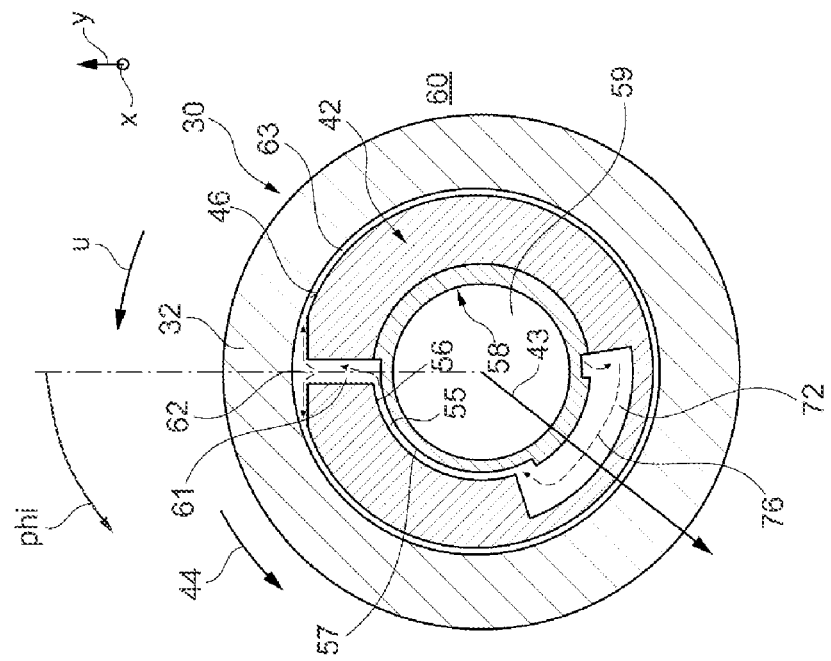
Figure 14:
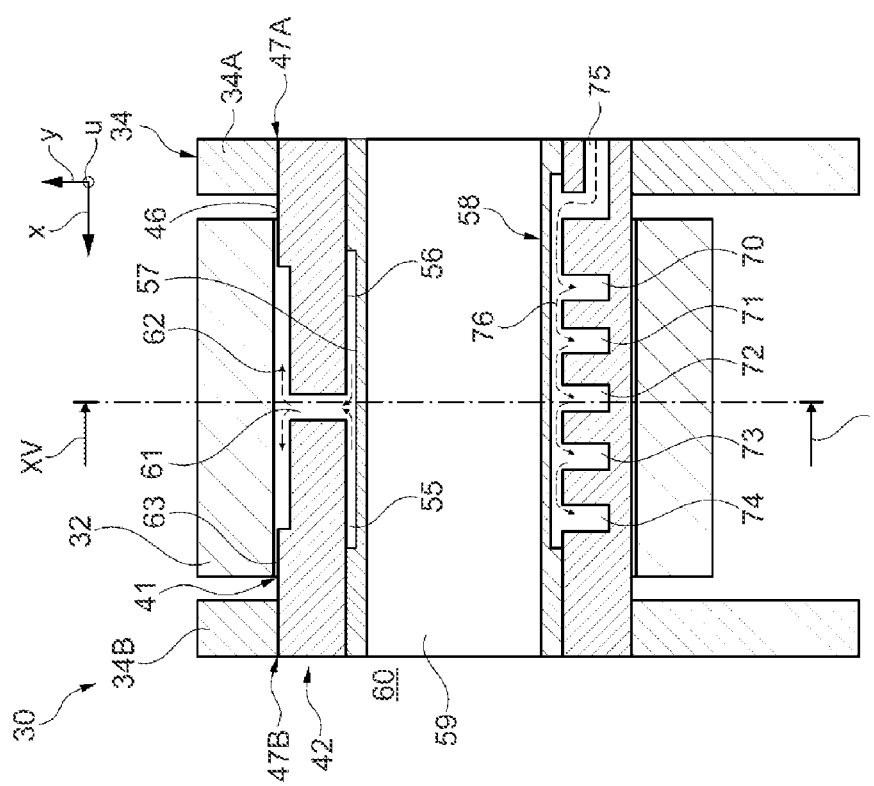
FIG. 14 shows an illustration corresponding to that of FIG. 6 of a further embodiment of the planetary gear box according to FIG. 3 with channels extending in the circumferential direction in the planet pin.
Figure 16:
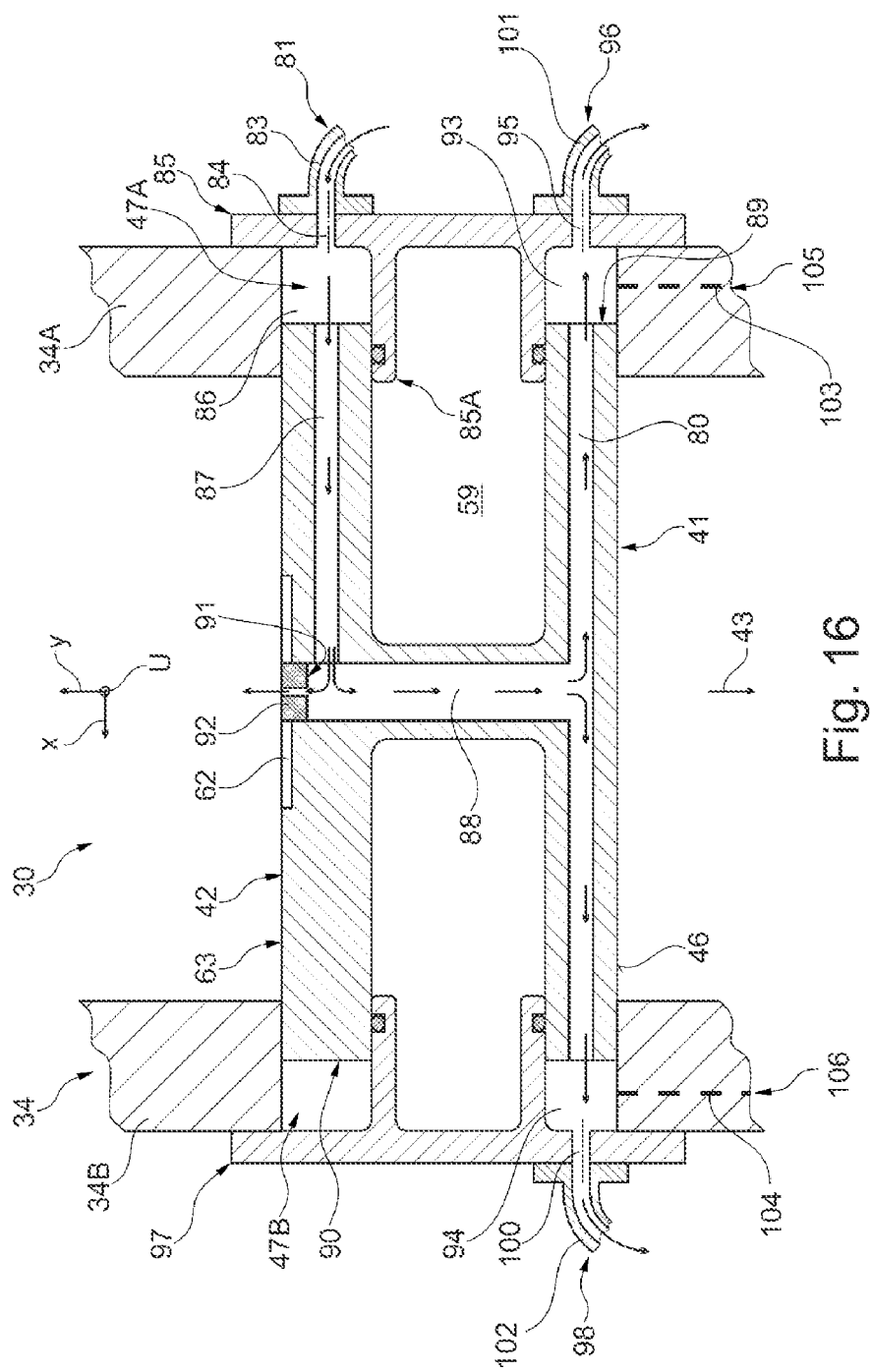

FIG. 15 shows a sectional view of the embodiment of the planetary gear box according to FIG. 14 along a section line XV-XV denoted more specifically in FIG. 14; and FIG. 16 shows an illustration corresponding to FIG. 6 of a further embodiment of the planetary gear box according to FIG. 3, in which oil can be guided out of channels provided in the planet pin in the direction of toothing of the planet gear.

Figure 1:
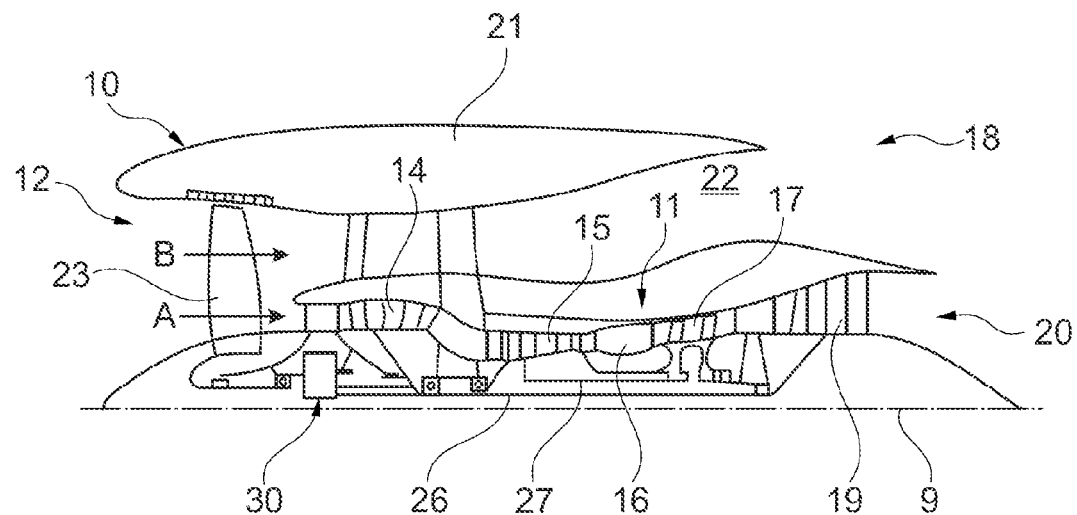
FIG. 1 shows a schematic longitudinal sectional view of a gas turbine engine.

FIG. 1 illustrates a gas turbine engine 10 with a main axis of rotation 9. The engine 10 comprises an air intake 12 and a thrust fan 23 that generates two airflows: a core airflow A and a bypass airflow B. The gas turbine engine 10 comprises a core 11 that receives the core airflow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30. The shaft 26 herein is also referred to as the core shaft.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by way of a suitable connecting shaft 27, which is also referred to as the core shaft. The fan 23 generally provides the majority of the propulsion force. The epicyclic gear box 30 is a reduction gear box.

Figure 2:
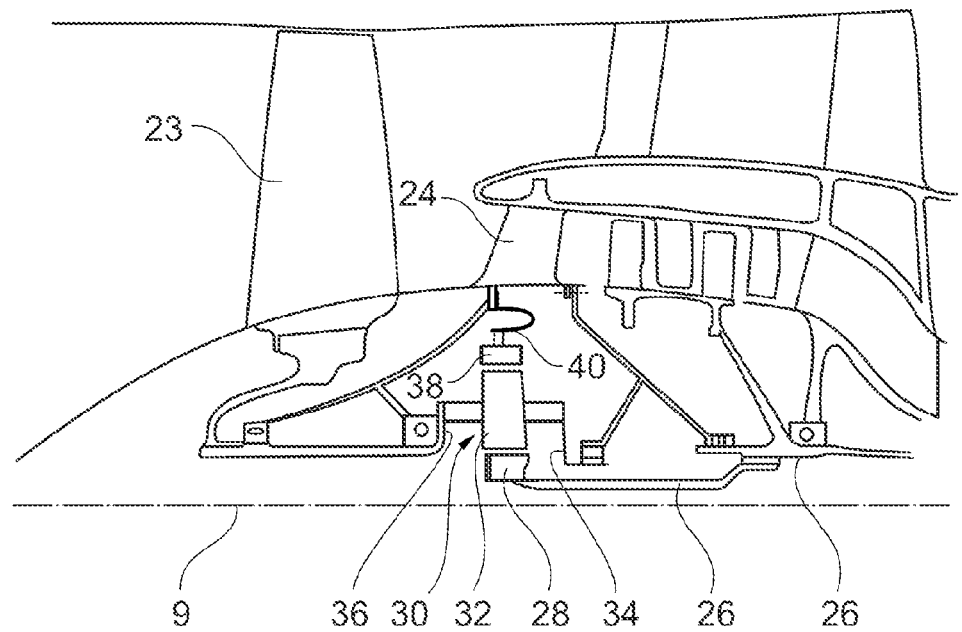
FIG. 2 shows an enlarged partial longitudinal sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic gear box arrangement 30. Multiple planet gears 32, which are coupled to one another by means of a planet carrier 34, are situated radially outside the sun gear 28 and mesh with the latter, and are in each case arranged so as to be rotatable on carrier elements or planet pins 42 which are connected in a rotationally fixed manner to the planet carrier 34. The planet carrier 34 limits the planet gears 32 to orbiting around the sun gear 28 in a synchronous manner while enabling each planet gear 32 to rotate about its own axis on the planet pins 42, which represent static axes. The planet carrier 34 is coupled by way of linkages 36 to the fan 23 so as to drive the rotation of the latter about the engine axis 9. Radially to the outside of the planet gears 32 and meshing therewith is an annulus or ring gear 38 that is coupled, via linkages 40, to a stationary support structure 24.

It is noted that the terms "low-pressure turbine" and "low-pressure compressor" as used herein can be taken to mean the lowest pressure turbine stage and the lowest pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

The epicyclic gear box 30 is shown in greater detail by way of example in FIG. 3. Each of the sun gear 28, the planet gears 32 and the ring gear 38 comprise teeth about their periphery to mesh with the other gears. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic gear box 30 generally comprise at least three planet gears 32.

The epicyclic gear box 30 illustrated by way of example in FIGS. 2 and 3 is of the planetary type, in which the planet carrier 34 is coupled to an output shaft via linkages 36, wherein the ring gear 38 is fixed. However, any other suitable type of epicyclic gear box 30 may be used. As a further example, the epicyclic gear box 30 may be a star arrangement, in which the planet carrier 34 is held fixed, with the ring gear (or annulus) 38 allowed to rotate. In the case of such an arrangement, the fan 23 is driven by the ring gear 38. As a further alternative example, the gear box 30 can be a differential gear box in which both the ring gear 38 and the planet carrier 34 are allowed to rotate.

It will be appreciated that the arrangement shown in FIGS. 2 and 3 is merely exemplary, and various alternatives fall within the scope of protection of the present disclosure.

Purely by way of example, any suitable arrangement can be used for positioning the gear box 30 in the engine 10 and/or for connecting the gear box 30 to the engine 10. By way of a further example, the connections (such as the linkages 36, 40 in the example of FIG. 2) between the gear box 30 and other parts of the engine 10 (such as the input shaft 26, the output shaft and the fixed structure 24) may have a certain degree of stiffness or flexibility. By way of a further example, any suitable arrangement of the bearings between rotating and stationary parts of the engine (for example between the input and output shafts of the gear box and the fixed structures, such as the gear box casing) may be used, and the disclosure is not limited to the exemplary arrangement of FIG. 2. For example, where the gear box 30 has a star arrangement (described above), the person skilled in the art would readily understand that the arrangement of output and support linkages and bearing positions would usually be different from those shown by way of example in FIG. 2.

Accordingly, the present disclosure extends to a gas turbine engine having an arbitrary arrangement of gear box types (for example star-shaped or planetary), support structures, input and output shaft arrangement, and bearing positions.

Optionally, the gear box may drive additional and/or alternative components (e.g. the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of further example, the gas turbine engine shown in FIG. 1 has a split flow nozzle 20, 22, meaning that the flow through the bypass duct 22 has a dedicated nozzle that is separate from and radially outside the engine core nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine.

The geometry of the gas turbine engine 10, and components thereof, is or are defined using a conventional axis system which comprises an axial direction X (which is aligned with the axis of rotation 9), a radial direction Y (in the direction from bottom to top in FIG. 1), and a circumferential direction U (perpendicular to the view in FIG. 1). The axial, radial and circumferential directions X, Y and U are mutually perpendicular.

Figure 4:
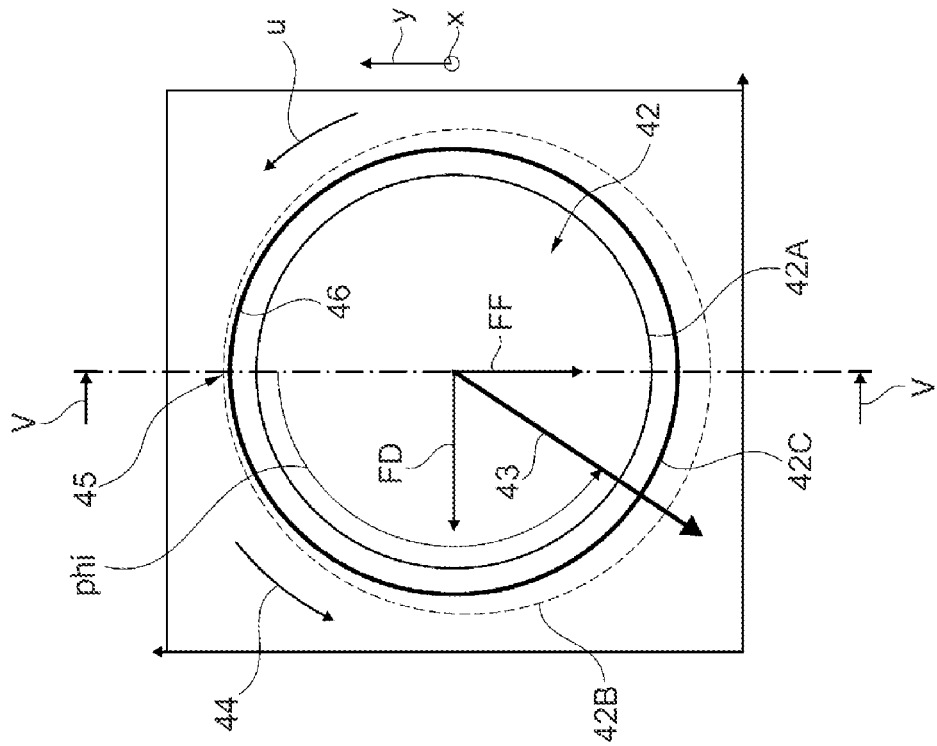
FIG. 4 shows a highly schematized isolated illustration of a planet pin of the planetary gear box according to FIG. 3, on which a planet gear is rotatably mounted.
Figure 5:
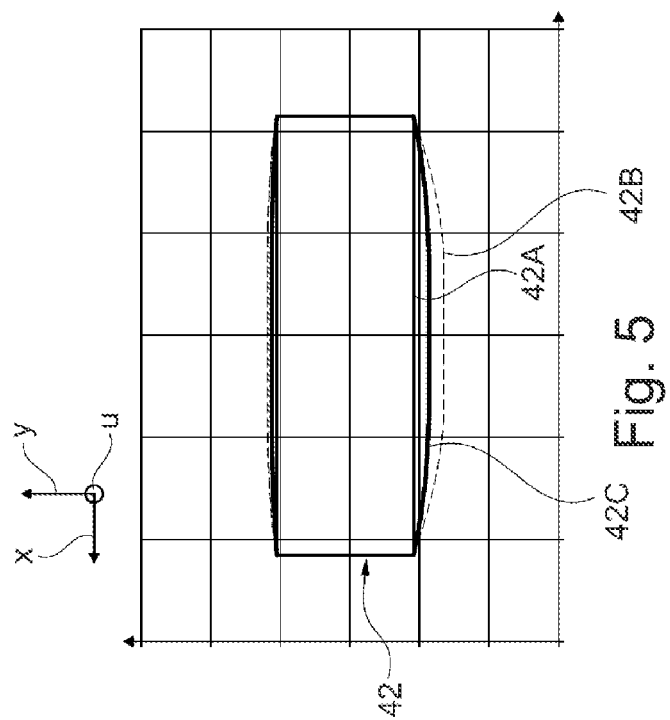
FIG. 5 shows a schematic longitudinal view of the planet pin according to FIG. 4 along a section line IV-IV denoted more specifically in FIG. 4.

FIG. 4 shows the planet pin 42 in isolation in a highly schematized side view, while the planet pin 42 in FIG. 5 is shown in a longitudinal sectional view. A first circular line 42A1 shown in FIG. 4 corresponds to the diameter of the planet pin 42 when the latter is substantially at the ambient temperature of the gas turbine engine 10. In contrast, the further line 42B1 corresponds to the circumference of the planet pin 42 during the operation of the gas turbine engine 10 of a planetary gear box 30 embodied in a conventional way. In addition, the arrow 43 indicates the main load direction of the plain bearing 41 between the planet gear 32 and the planet pin 42.

The main load direction 43 corresponds to the direction of the resultant bearing force of the plain bearing 41, which is composed of the bearing force component FD and the further bearing force component FF. Bearing force component FD in each case results from the torque applied to the planetary gear box 30. The further bearing force component FF results from the centrifugal force which acts on the planet gear 32 when the planet carrier 34 is rotating during the operation of the planetary gear box.

If the planet carrier 34 is of non-rotatable design, the main load direction 43 of the plain bearing 41 corresponds substantially to the direction of bearing force component FD since there is then no centrifugal force acting on the planet gear 32. In addition, the direction of rotation of the planet gear 32 is indicated in FIG. 4 by the reference sign 44.

Bearing force component FD encloses an angle phi equal to 90°, in the direction of rotation 44 of the planet gear 32, with the radial direction of extent of the planet carrier 34, which is the same as the radial direction y in FIG. 4 and passes through the center of the planet pin 42 and the radially outer point 45. Bearing force component FF encloses an angle phi equal to 180°, in the direction of rotation 44 of the planet gear 32, with the radial direction of extent of the planet carrier 34.

When the planet carrier 34 is of rotatable design, the angular value of the angle phi which the main load direction 43 encloses with the radial direction of the planet carrier 34 is in a range of from 110° to 180°, depending on the operating state.

During the operation of the gas turbine engine 10, the outside diameter of the planet pin 42 on the line 42B1 increases to a greater and greater extent in the direction of rotation 44 of the planet gear 32, starting from a radially outer point 45 on an outer side 46 of the planet pin 42. In the region of the planet pin 42 which surrounds the main load direction 43 at the circumference, the outside diameter of the planet pin 42 differs to a substantially greater extent from the circular line 42A than at the radially outer point 45 on the outer side 46 of the planet pin 42. This results from the fact that the non-rotating planet pin 42, which is connected to the planet carrier 34 in a manner precluding relative rotation, is subject to the greatest heat input in the region of the main load direction 43. This is the case because a bearing gap 63 of the plain bearing 41 between an outer side 46 of the planet pin 42 and an inner side 64 of the planet gear 32 is at its smallest here owing to the acting load.

In contrast, the rotating planet gear 32 does not have locally limited heating corresponding to the planet pin 42 on account of the rotation and thermal inertia. For this reason, the inside diameter of the planet gear 32 expands uniformly in the circumferential direction as the operating temperature of the planetary gear box 30 increases.

Owing to the different expansion behavior of the planet pin 42 and the planet gear 32, the height of the bearing gap 63 of the plain bearing 41 is reduced to an even greater extent in the main load zone extending around the main load direction 43 in the circumferential direction U. In the region of the main load zone of the plain bearing 41 and especially in the planet pin 42, this results in very high operating temperatures in a locally limited area. These high operating temperatures prejudice a service life of the plain bearing 41 to an unwanted extent.

FIG. 5 shows a longitudinal sectional view of the planet pin 42 along a section line V-V denoted more specifically in FIG. 4. From the illustration according to FIG. 5, it is evident that the planet pin 42 expands to a greater extent centrally than in the region of its ends at relatively high operating temperatures.

FIG. 6 shows a partial longitudinal sectional view of the planetary gear box 30 along a section line VI-VI denoted more specifically in FIG. 3. The planet carrier 34 comprises two cheeks 34A and 34B spaced apart in the axial direction X. The planet pin 42 is arranged non-rotatably at the ends in respective holes 47A and 47B in the cheeks 34A and 34B of the planet carrier 34. In addition, FIG. 7 shows a cross-sectional view of the planetary gear box 30 along a section line VII-VII denoted more specifically in FIG. 6.

From the illustrations according to FIG. 6 and FIG. 7, it is evident that two channels 48, 49 are provided in the planet pin 42 around the main load direction 43 or in the circumferential direction U around the main load direction 43 in the region of the main load zone. The channels 48, 49 extend in the axial direction X in the planet pin 42, radially inside the outer side 46. Transmission oil is introduced laterally into the channels 48 and 49 via inlets 50, 51. The channels 48, 49 are each embodied as blind holes and are embodied with flow-guiding units 52A, 52B or turbulators. The flow guiding units 52A, 52B are embodied essentially with webs, which each project alternately radially inward into the cross section of the channels 48, 49 from the side walls of the channels 48, 49 in the radial direction Y. This has the effect that a serpentine flow path 53 is imparted to the transmission oil by each of the channels 48, 49. As a result, heat dissipation by means of the transmission oil guided through the channels 48, 49 is improved.

Depending on the respective application, there is also the possibility of embodying the flow-guiding units in some other suitable way in order to achieve a flow path of the transmission oil in the channels 48, 49 which is as long as possible in a manner which is favorable in terms of installation space.

In the exemplary embodiment of the gear box 30 which is illustrated in FIG. 6 and FIG. 7, the transmission oil is guided in co-current flow from the inlets 50 and 51 of the two channels 48 and 49 in the direction of further holes 54A, 54B, which extend radially inward. The holes 54A, 54B open into an annular space 55, which is bounded by an inner side 56 of the planet pin 42 of hollow-cylindrical design and an outer side 57 of an inner sleeve 58. The inner sleeve 58 is press-fitted into a hole 59 in the planet pin 42 and seals off the annular space 55 from the environment 60 of the annular space 55 at each of the ends.

The annular space 55 is connected fluidically, via a further hole 61, which extends outward in the radial direction Y in the planet pin 42, to what is known as an oil feed pocket 62 of the plain bearing 41. In the present case, the oil feed pocket 62 is provided in the region of the radially outer point 45 of the planet pin 42 and hence also of the plain bearing 41. Thus, in the circumferential direction U of the planet pin 42, the oil feed pocket 62 is arranged in a region of the plain bearing 41 which is subject to low loads. This ensures the oil fed into the oil feed pocket 62 via the further hole 61 enters the bearing gap 63 of the plain bearing 41 in the desired manner during the rotation of the planet gear 32.

Depending on the respective application, the channels 48, 49 are arranged in a circumferential region of the plain bearing 41 which encloses angular values of the angle phi in a range of from 120° to 225°, preferably of from 120° to 200°, with the radial direction Y of the planet carrier 34 in the direction of rotation 44 of the planet gear 32. In addition, there is the possibility that the oil feed pocket 62 is arranged outside a circumferential region of the plain bearing 41 which encloses angular values of the angle phi in a range of from 90° to 190°, preferably of from 30° to 210°, with the radial direction Y of the planet carrier 34 in the direction of rotation 44 of the planet gear 32. This ensures that the oil feed pocket 62 is arranged outside a highly loaded region of the plain bearing 41 and that oil can be introduced into the bearing gap 63 between the planet gear 32 and the planet pin 42 with little effort.

Figure 8:
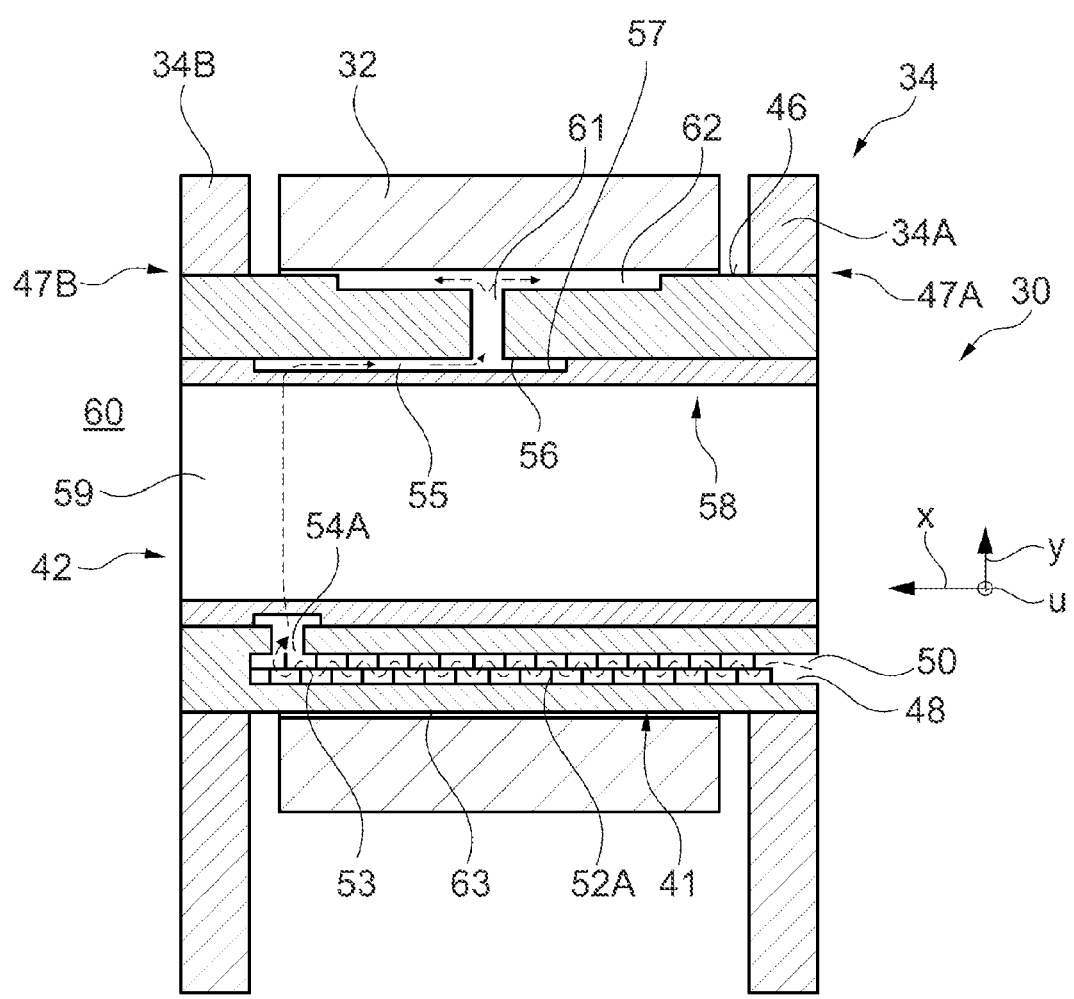
FIG. 8 shows an illustration corresponding to that of FIG. 6 of a further embodiment of the planetary gear box according to FIG. 3.

FIG. 8 shows an illustration corresponding to FIG. 6 of a further embodiment of the planetary gear box 30, the fundamental design of which correspond substantially to that described with reference to FIG. 6 and FIG. 7. For this reason, only the design differences between the planetary gear box 30 according to FIG. 8 and the planetary gear box 30 according to FIG. 6 are explored in detail below. In the embodiment of the planetary gear box 30 according to FIG. 8, the annular space 55 is embodied with a significantly shorter length in the axial direction X, whereby unwanted stagnation zones in the flow path of the transmission oil between the holes 54A, 54B and the further hole 61 in the planet pin 42 are avoided in a manner which is simple in terms of design.

Figure 9:
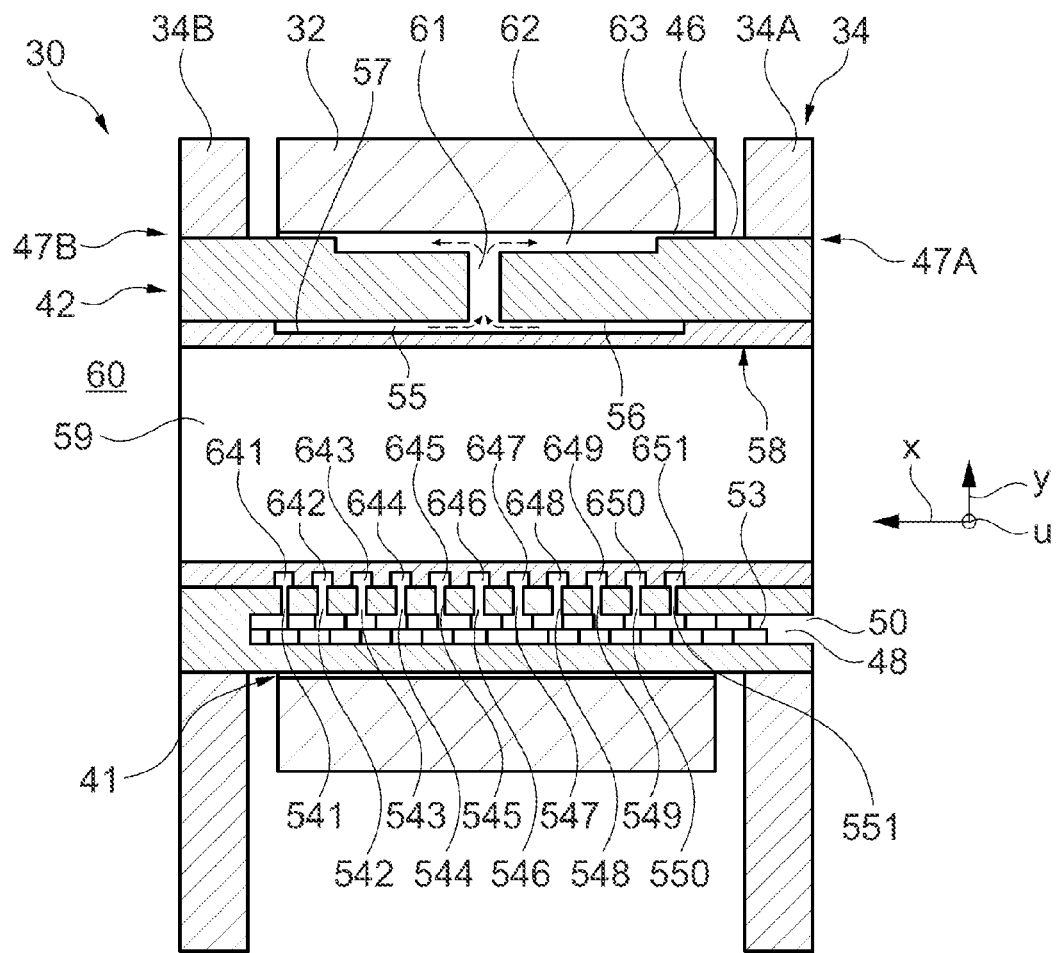
FIG. 9 shows an illustration corresponding to that of FIG. 6 of a further embodiment of the planetary gear box according to FIG. 3.

FIG. 9 likewise shows an illustration corresponding to FIG. 6 of a further exemplary embodiment of the planetary gear box 30, which likewise differs in design from the embodiment of the planetary gear box 30 according to FIG. 6 only in partial regions. In the planetary gear box 30 according to FIG. 9, the two channels 48 and 49 are connected to the oil feed pocket 62 via a plurality of holes 541 to 551 extending radially inward. The holes 541 to 551 are spaced apart in the axial direction of the planet pin 42 and open radially inward into annular space regions 641 to 651, which are initially likewise spaced apart in the axial direction and are separate from one another and which are connected fluidically to the annular space 55.

With this embodiment of the transmission oil routing between the channels 48 and 49 and the annular space 55, stagnation zones in the flow path of the transmission oil in the direction of the oil feed pocket 62 are avoided in a manner which is simple in terms of design. In the present case, the annular space regions 641 to 651 are embodied as grooves in the inner sleeve which extend in the circumferential direction and are simple to produce in terms of manufacturing technology.

FIG. 10 shows a further exemplary embodiment of the planetary gear box 30 in an illustration corresponding to FIG. 6. In addition, FIG. 11 shows a cross-sectional view of the planetary gear box 30 according to FIG. 10 along a section line XI-XI denoted more specifically in FIG. 10. FIG. 10 shows the channel 48, into which the transmission oil is introduced in the axial direction X via the inlet 50. The transmission oil flows from the inlet 50 in the direction of hole 54A, in the region of which the transmission oil is introduced radially inward into an annular space portion 66 bounded in the circumferential direction by the inner sleeve 58. The annular space portion 66 is connected to the further hole 54B, which is shown in FIG. 12 and which establishes a connection between the annular space portion 66 and the further channel 49.

The transmission oil entering radially outward into channel 49 from the annular space portion 66 and via the further hole 54B flows in the axial direction X in channel 49 in the direction of the inlet 50 of channel 48. In channel 49, the transmission oil thus has a flow direction which is counter to the flow direction of the transmission oil in channel 48. Thus, the transmission oil is guided in what is known as countercurrent flow in channels 48 and 49. A more uniform temperature distribution is thereby achieved in the axial direction X of the plain bearing 43 than is the case with the embodiment of the planetary gear box 30 according to FIG. 6, in which the transmission oil is passed through channels 48 and 49 in co-current flow.

In the end region of channel 49 which faces the inlet 50 of channel 48, the transmission oil is introduced from channel 49, via a further hole 67 extending radially inward in the planet pin 42, into a further annular space portion 68. The further annular space portion 68 is connected fluidically to the annular space 55 in the circumferential direction of the planet pin 42 and of the inner sleeve 58. From the annular space 55, the transmission oil is introduced into the oil feed pocket 62 via hole 59.

FIG. 14 shows a further embodiment of the planetary gear box 30 in an illustration corresponding to FIG. 6. In contrast to the planetary gear box 30 according to FIG. 6, the planetary gear box 30 according to FIG. 14 is embodied with a plurality of channels 70 to 74 which are arranged adjacent to one another in the axial direction X and extend in the circumferential direction U in the planet pin 42, radially inside the outer side 46 of the planet pin 42. Transmission oil is introduced laterally into the planet pin 42 via an inlet 75, and is introduced into channels 70 to 74 in accordance with the line 76. The transmission oil then flows through channels 70 to 74 in the circumferential direction of the planet pin 42 and counter to the direction of rotation 44 of the planet gear 32 in the manner shown in more detail in FIG. 15. Following this, the transmission oil enters the annular space 55 and flows from there in the circumferential direction U in the direction of hole 61, which ultimately establishes the connection between the annular space 55 and the oil feed pocket 62.

The outside diameter of the planet pin 42, which is illustrated by the lines 42C in FIG. 4 and FIG. 5, is established during the operation of the gas turbine engine 10 when the planet pin 42 is embodied with the channels 48 and 49 in the manner described above. In the illustrations according to FIG. 4 and FIG. 5, it is evident in this case that the thermal expansion of the planet pin 42, particularly in the main load zone around the main load direction 43, is significantly less by virtue of the local temperature control by means of the transmission oil passed through channels 48 and 49 or 70 to 74 than is the case with plain bearings which are embodied without the channels 48 and 49.

FIG. 16 shows an illustration corresponding to FIG. 6 of a further embodiment of the planetary gear box 30 according to FIG. 3, which differs only in partial regions from the embodiments of the planetary gear box 30 which have been described in detail above. For this reason, it is essentially only differences between the exemplary embodiments described in detail above and the exemplary embodiment of the planetary gear box 30 according to FIG. 16 which are explored in greater detail in the description which follows, and attention is drawn in respect of the fundamental mode of operation of the planetary gear box 30 according to FIG. 16 to the above description relating to FIG. 1 to FIG. 15.

Provided in the planet pin 42 is at least one channel 80, which, like channels 48, 49 and 70 to 74, is provided for temperature control or cooling of the main load zone of the plain bearing 41 and of the planet pin 42 in the region of the main load zone around the main load direction 43 or in the circumferential direction U around the main load direction 43. For this purpose, oil is introduced under pressure from a feed region 81 into a line 87 in the planet pin 42, said line being provided in such a way as to extend in the planet pin 42 in the axial direction X of the latter and being connected fluidically to the channel 80, with the result that the oil flows out of the line 87 into the channel 80.

In the present case, the feed region 81 comprises an oil feed line 83 arranged axially outside the cheek 34A of the planet carrier 34. Oil flows out of the oil feed line 83 through a hole 84 in a plug 85 that seals off the hole 47A in the cheek 34A with respect to the environment of the planet carrier 34. Furthermore, the plug 85 engages by means of a cylindrical region 85A in the hole 59 in the planet pin 42 and seals off the inner region, delimited by the hole 59, of the planet pin 42 with respect to a cavity 86, which is delimited by the plug 85, the planet pin 42 and the cheek 34A. The oil flows out of the oil feed line 83 into the cavity 86 and, from there, into the line 87 of the planet pin 42.

The line 87 opens into an oil-guiding region 88, which extends in the circumferential direction U in the planet pin 42, has a cross section closed with respect to the bearing gap 63 and is connected both to the oil feed pocket 62 and to the channel 80. The oil is introduced from the oil feed line 83 partially into the oil feed pocket 62 and partially into the channel 80. In this case, the oil-guiding region 88, which is embodied as a circumferentially closed channel or closed line, opens into the oil feed pocket 62 and the channel 80 in the axial direction X of the planet pin 42, preferably in each case centrally between axial ends 89, 90 of the planet pin 42.

In the region of opening 91 of the oil-guiding region 88 into the oil feed pocket 62, a "restrictor" 92 or throttle unit is provided, by means of which an oil volume flow from the oil-guiding region 88 into the oil feed pocket 62 can be limited to a defined extent in order to ensure a controlled flow of oil into the bearing gap 63 of the plain bearing 41. Here, the controlled flow of oil into the bearing gap 63 is such that as good as possible cooling and lubrication of the plain bearing 41 is achieved in the bearing gap 63, both in the axial direction X and in the circumferential direction U.

The channel 80 is designed with a closed cross section, thereby ensuring that there is no radial flow of the oil out of the channel 80, via the outer side 46 of the planet pin 42, into the bearing gap 63 of the plain bearing 41. Moreover, the channel 80 opens in the axial direction X into respective further cavities 93, 94 in the axial ends 89 and 90 of the planet carrier 42. There, the oil flows out of the channel 80 in the axial direction X into each of the further cavities 93, 94. In this case, the further cavity 93 is delimited by the cheek 34A of the planet carrier 34, the plug 85 and the planet pin 42.

The further cavity 93 can be connected to a discharge device 96 either via a hole 95 in the plug 85. The discharge device 96 is connected via a line 101, which is provided in such a way as to extend outside the planet carrier 34, to a nozzle, referred to as a "spray bar", or the like, by means of which the oil is guided or sprayed from the further cavity 93 in the direction of toothing of the planet gear 32, which is in engagement with the sun gear 28. The tooth engagement location between the planet gear 32 and the sun gear 28 is thereby supplied to the required extent and in a manner that is simple in terms of design with oil for lubrication and cooling.

In addition, hole 47B in cheek 34B, like hole 47A in cheek 34A, is closed by a further plug 97. Together with cheek 34B and the planet pin 42, the further plug 97 delimits the other further cavity 94. The oil which flows out of the channel 80 into the further cavity 94 is guided via a hole 100 in the further plug 97 and a further discharge device 98 and a line 102 operatively connected thereto in the direction of the toothing of the planet gear 32 and is sprayed onto the toothing via a nozzle or a spray bar or as an oil jet or in the form of a plurality of oil jets. The tooth engagement location between the planet gear 32 and the sun gear 28 is thus supplied from both sides of the planet carrier 34.

In addition thereto or as an alternative thereto, it is also possible to provide for the oil to be introduced from the cavities 93 and 94 into lines 103 and 104 of further discharge devices 105, 106. Lines 103 and 104 extend inwards in the radial direction Y in the cheeks 34A and 34B of the planet carrier 34, in the manner indicated in FIG. 16 by the respective dashed lines, to nozzles and/or spray bars. The oil is applied from the channel 80 to the tooth engagement locations between the planet gear 32 and the sun gear 28 via the nozzles and/or spray bars from both sides of the planet carrier 34.

The arrangement, shown in FIG. 16, of the line 87 and of the channel 80 in the planet pin 42 is chosen in the same plane of the drawing for the sake of greater ease of illustration. It is of course within the discretion of a person skilled in the art to arrange the line 87 and also the oil feed line 83 in a radially inner region of the planet pin 32 in order to utilize the centrifugal force acting on the oil during operation to direct the oil onwards in the direction of the oil feed pocket 62 and, for example, also to temperature-control or cool the planet pin 42 in the region of its high-load zone already with the oil volume flow which is guided through the line 87 to the channel 80 and to the oil feed pocket 62.

There is also the possibility that the channel 80 and the oil feed pocket 62 are supplied with oil via mutually separate or independent oil feeds and lines.

Depending on the respective application, it is also possible in the region of the high-load zone of the plain bearing 41 to provide a plurality of channels 80, which are embodied as holes or the like and which are provided in the planet pin 32 radially inside the outer side 46 of the planet pin 42, extending in the axial direction X, with a cross section that is closed with respect to the bearing gap 63.

LIST OF REFERENCE SIGNS

9 Main axis of rotation
10 Gas turbine engine
11 Core
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Thrust fan
24 Support structure
26 Shaft, connecting shaft
27 Connecting shaft
28 Sun gear
30 Gear box, planetary gear box
32 Planet gear
34 Planet carrier
34A, 34B Cheeks
36 Linkage
38 Ring gear
40 Linkage
41 Plain bearing
42 Planet pin
42A, 42B, 42C Outside diameter of the planet pin
43 Arrow, main load direction
44 Direction of rotation of the planet gear
45 Radially outer point of the planet pin
46 Outer side of the planet pin
47A, 47B Hole in cheek 34A and 34B, respectively
48, 49 Channel
50, 51 Inlet of the channels
52 Flow-guiding unit, turbulators
53 Line
54A, 54B Hole
$54_1$ to $55_1$ Hole
55 Annular space
56 Inner side of the planet pin
57 Outer side of the inner sleeve
58 Inner sleeve
59 Hole
60 Environment
61 Further hole
62 Oil feed pocket
63 Bearing gap
64 Inner side of the planet gear
$64_1$ to $65_1$ Annular space portion
66 Annular space portion
67 Hole
68 Further annular space portion
70 to 74 Radial channel
75 Inlet
76 Line
80 Channel
81 Feed region
83 Oil feed region
84 Hole
85 Plug
85A Cylindrical region of the plug 85
86 Cavity
87 Line
88 Oil-guiding region
89, 90 End
91 Region of opening
92 Restrictor
93, 94 Further cavity
95 Hole in the plug 85
96 Discharge device
97 Further plug
98 Further discharge device
100 Hole in the further plug
101 to 104 Line
105, 106 Further discharge devices
A Core air flow
B Air flow
FD Bearing force component
FF Bearing force component
phi Angle
U Circumferential direction
X Axial direction
Y Radial direction

The invention claimed is:

1. A planetary gear box for a gas turbine engine, having a planet carrier and having a planet gear, which is mounted rotatably by means of a plain bearing on a carrier element connected to the planet carrier in a manner precluding relative rotation, wherein at least one oil feed pocket is provided in a region of an outer side of the carrier element, via which at least one oil feed pocket oil is passed into a bearing gap between an outer side of the carrier element and an inner side of the planet gear, wherein, in a circumferential region of a main load direction of the plain bearing, the carrier element is formed with at least one channel carrying transmission oil, the at least one channel provided to extend in the carrier element radially inside the outer side of the carrier element, extending in an axial direction of the carrier element at least in some region or regions, and is embodied with a cross section that is closed with respect to the bearing gap.

2. The planetary gear box according to claim 1, wherein the planet carrier is non-rotatable, and
- a main load direction of the plain bearing encloses an angle of about 90° with a radial direction of the planet carrier in a direction of rotation of the planet gear,
- the at least one channel is arranged in a circumferential region of the plain bearing which encloses angular values in a range of from 60° to 135° with the radial direction of the planet carrier in the direction of rotation of the planet gear, and
- the at least one oil feed pocket is arranged outside a circumferential region of the plain bearing which encloses angular values in a range of from 10° to 100° with the radial direction of the planet carrier in the direction of rotation of the planet gear.

3. The planetary gear box according to claim 1, wherein the planet carrier is rotatable, and
- depending on an operating point, a main load direction of the plain bearing encloses angular values of from 110° to 180° with a radial direction of the planet carrier in a direction of rotation of the planet gear,
- the at least one channel is arranged in a circumferential region of the plain bearing which encloses angular values in a range of from 120° to 225° with the radial direction of the planet carrier in the direction of rotation of the planet gear, and
- the at least one oil feed pocket is arranged outside a circumferential region of the plain bearing which encloses angular values in a range of from 90° to 190° with the radial direction of the planet carrier in the direction of rotation of the planet gear.

4. The planetary gear box according to claim 1, wherein the at least one channel extends in the carrier element radially inside the outer side of the carrier element in the axial direction and/or in the circumferential direction of the carrier element.

5. The planetary gear box according to claim 1, wherein a plurality of channels is provided, which are provided so as to extend in the axial direction and/or in the circumferential direction of the carrier element.

6. The planetary gear box according to claim 5, wherein the channels are connected fluidically to one another.

7. The planetary gear box according to claim 1, wherein the at least one channel or channels are connected fluidically to the at least one oil feed pocket downstream of a feed region of the transmission oil into the at least one channel or into the channels.

8. The planetary gear box according claim 1, wherein the at least one channel or channels each have a diameter of between 5 mm and 15 mm.

9. The planetary gear box according to claim 5, wherein the channels are operatively connected to a feed region such that transmission oil is guided in co-current or countercurrent flow at least in two channels extending adjacent to one another in the carrier element.

10. The planetary gear box according to claim 9, wherein at least the two adjacent channels through which the transmission oil is guided in co-current flow are each operatively connected on an inlet side to the feed region.

11. The planetary gear box according to claim 9, wherein at least one of the two channels through which the transmission oil is guided in countercurrent flow is operatively connected on an inlet side to the feed region and connected on an outlet side to the inlet side of the adjacent channel.

12. The planetary gear box according to claim 1 wherein the carrier element is embodied, at least in some region or regions, with an inner aperture provided radially inside the outer side, wherein at least one region of the at least one channel or at least one of the channels is embodied in a region of the inner aperture as a groove which extends in the axial direction and/or in the circumferential direction of the carrier element and which is sealed off from an environment by a further component part.

13. The planetary gear box according to claim 12, wherein the further component part and the carrier element delimit a region which carries transmission oil and which establishes a connection between an outlet of the at least one channel or between at least one outlet of one of the channels and the at least one oil feed pocket.

14. The planetary gear box according to claim 13, wherein the region carrying transmission oil is connected to the at least one oil feed pocket by a hole which extends radially in the carrier element.

15. The planetary gear box according to claim 1, wherein respective flow-guiding units are provided in the at least one channel or in the channels for the transmission oil, by means of which flow-guiding units a flow of the transmission oil in the at least one channel or in the channels is in each case deflected.

16. A gas turbine engine for an aircraft, said gas turbine engine comprising the following:
- an engine core which comprises a turbine, a compressor, and a core shaft that connects the turbine to the compressor;
- a fan which is positioned upstream of the engine core, wherein the fan comprises multiple fan blades; and
- a gear box, which receives an input from the core shaft and outputs drive for the fan to drive the fan at a lower speed than the core shaft, wherein the gear box is embodied as the planetary gear box according to claim 1.

17. The gas turbine engine according to claim 16, wherein the turbine is a first turbine, the compressor is a first compressor, and the core shaft is a first core shaft;
- the engine core furthermore comprises a second turbine, a second compressor and a second core shaft which connects the second turbine to the second compressor; and
- the second turbine, the second compressor and the second core shaft are arranged to rotate at a higher rotational speed than the first core shaft.

18. The planetary gear box according to claim 1, wherein the at least one channel is of open configuration in the axial direction of the carrier element, at least in a region of one end of the carrier element, and is connected to a discharge device, via which the oil is guided out of the at least one channel in a direction of a tooth profile of the planet gear.

19. The planetary gear box according to claim 1, wherein a feed region, via which oil is introduced into the carrier element, is connected via lines in the carrier element to the at least one channel or channels and to the at least one oil feed pocket, wherein the oil which is introduced into the carrier element via the feed region is guided via the lines partially into the at least one channel or channels and partially into the at least one oil feed pocket.

20. A plain bearing for a planetary gear box of a gas turbine engine of an aircraft, having a static axle and a component part rotatably mounted thereon,
  wherein at least one oil feed pocket is provided in a region of an outer side of the axle, via which at least one oil feed pocket oil is passed into a bearing gap between the outer side of the axle and an inner side of the rotatable component part,
  wherein, in a circumferential region of a main load direction of the plain bearing, the axle is formed with at least one channel carrying transmission oil, the at least one channel is provided in such a way as to extend in the axle radially inside the outer side of the axle, extending in an axial direction of the axle at least in some region or regions, and is embodied with a cross section that is closed with respect to the bearing gap.

21. The plain bearing according to claim 20, wherein the axle is connected to a non-rotatable component part in a manner precluding relative rotation, and
  a main load direction of the plain bearing encloses an angle of about 90° with a radial direction of the non-rotatable component part in a direction of rotation of the rotatable component part,
  the at least one channel is arranged in a circumferential region of the axle which encloses angular values in a range of from 60° to 135° with the radial direction of the non-rotatable component part in the direction of rotation of the rotatable component part, and
  in a circumferential direction, the at least one oil feed pocket is arranged outside a circumferential region of the axle which encloses angular values in a range of from 10° to 100° with the radial direction of the non-rotatable component part in the direction of rotation.

22. The plain bearing according to claim 20, wherein the axle is connected to a further non-rotatable component part in a manner precluding relative rotation, and
  depending on the operating point, a main load direction of the plain bearing encloses angular values of from 110° to 180° with a radial direction of the further rotatable component part in a direction of rotation of the rotatable component part,
  the at least one channel is arranged in a circumferential region of the axle which encloses angular values in a range of from 120° to 225° with the radial direction of the further rotatable component part in the direction of rotation of the rotatable component part, and
  in a circumferential direction, the at least one oil feed pocket is arranged outside a circumferential region of the axle which encloses angular values in a range of from 90° to 190° with the radial direction of the further rotatable component part in the direction of rotation of the rotatable component part.

23. The plain bearing according claim 20, wherein the at least one channel extends in the axle radially inside the outer side of the axle in the axial direction and/or in a circumferential direction of the axle.

* * * * *